United States Patent [19]

Oberkobusch et al.

[11] Patent Number: 5,047,259

[45] Date of Patent: Sep. 10, 1991

[54] ACRYLIC COPOLYMER FLOW CONTROL AGENTS

[75] Inventors: Doris Oberkobusch, Duesseldorf; Wolfgang Gress, Wuppertal-Elberfeld; Bernd Wegemund, Haan, all of Fed. Rep. of Germany

[73] Assignee: Henkel Kommanditgesellschaft auf Aktien, Duesseldorf, Fed. Rep. of Germany

[21] Appl. No.: 399,664

[22] Filed: Aug. 25, 1989

[30] Foreign Application Priority Data

Aug. 25, 1988 [DE] Fed. Rep. of Germany ....... 3828876

[51] Int. Cl.⁵ .......................... B05D 1/04; B05D 1/06; B05D 5/00; B05D 3/02
[52] U.S. Cl. ....................................... 427/27; 427/195; 526/262
[58] Field of Search .................... 427/27, 195; 526/262

[56] References Cited

U.S. PATENT DOCUMENTS 4,286,021 8/1981 Brendley .......................... 429/195 X

OTHER PUBLICATIONS

Ullmann's Enzyklopaedie der tech. Chm., 4, vol. 15, pp. 660–664 (1978).
Kirk–Othmer, vol. 13, (1981), pp. 355–373.

Primary Examiner—Michael Lusignan
Attorney, Agent, or Firm—Wayne C. Jaeschke; John E. Drach; Henry E. Millson, Jr.

[57] ABSTRACT

Copolymers of long-chain alkyl acrylates corresponding to the following formula

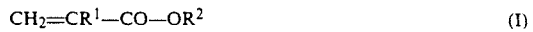
$$CH_2=CR^1-CO-OR^2 \qquad (I)$$

in which $R^1$ is a hydrogen atom or a methyl group and $R^2$ is the residue of a $C_{16-34}$ fatty alcohol, with N-containing olefins containing acrylate or methacrylate functions can be used as flow control agents for powder coatings.

26 Claims, No Drawings

ACRYLIC COPOLYMER FLOW CONTROL AGENTS

BACKGROUND OF THE INVENTION

1. Field of the Invention

This invention relates to a process for coating a metal surface with a powder coating containing an acrylic copolymer flow control agent.

2. Description of the Related Art

Low-solvent or solventless paint systems are becoming increasingly more important. Paint systems such as these include the so-called powder coatings, i.e. solventless powder-form paints which are generally applied to substrates by electrostatic application and are hardened at relatively high temperatures. The success of this technique presupposes the presence of all components in powder form.

To obtain satisfactory surfaces with powder coatings, flow control agents are added. Flow control agents are generally liquid polyacrylate-based products which, basically, are incorporated in the powder coatings in two different ways, namely: (1) in the form of a so-called master batch, the liquid flow control agent being fused into the binder component of the powder coating; the solidified melt is then broken up and made up for subsequent processing; (2) in the form of a liquid coated onto an inert support, for example silica gel.

The disadvantage of the master batch technique is that the formulation of powder coatings is limited because the binder of the master batch has to be identical or at least compatible with the principal binder of the formulation. Flow control agents coated onto a support can lead to a reduction in the gloss of the coating and to a reduction in transparency in the case of clear powder coatings and, under adverse conditions, to a reduction in the stability of the powder coating in storage.

The present invention relates to solid, powder-form flow control agents which require neither an inert support nor incorporation by the master batch technique, so that the disadvantages mentioned above can be avoided.

The present invention is applicable to standard types of powder coatings as described in Ullmann's Enzyklopädie der technischen Chemie, 4th Edition, Vol. 15, pages 660-664, Verlag Chemie Weinheim (1978), to the contents of which reference is expressly made. The present invention is particularly suitable for so-call ed` electrostatic powders based on epoxy resins, saturated polyester resins and polyacrylates, cf. loc. cit., pages 660-661, number 3.4.1. The acrylic copolymers used as flow control agents in the present invention are disclosed in U.S. patent application Ser. No. 07/326,598 filed on March 3, 1989, now U.S. Pat. No. 5,006,621, patented Apr. 9, 1991.

SUMMARY OF THE INVENTION

The present invention provides a powder coating process comprising the steps of: (1) applying a powder paint comprising a thermoplastic or thermosetting resin and from about 0.1% to about 2.0% by weight of a flow control agent to a metal substrate, wherein said flow control agent is a copolymer comprising units of: (A) an acrylate of the formula (I)

$$CH_2=CR^1-CO-OR^2 \qquad I$$

wherein $R^1$ is a hydrogen atom or a methyl group and $OR^2$ is the residue of a $C_{16-34}$ fatty alcohol, and an N-containing olefin selected from the group consisting of: (B) a compound of the formula (II) or (VI)

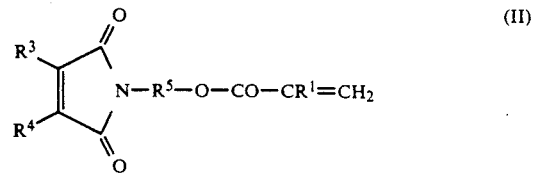

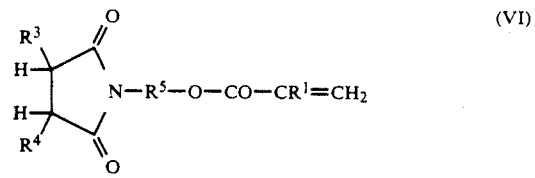

wherein $R^3$ and $R^4$ are together or separately hydrogen or $C_{1-4}$ alkyl groups or when taken together are ring fragments of an unsubstituted or a $C_{1-4}$-alkyl-substituted $C_5$ or $C_6$ ring, $R^5$ is a linear or branched $C_{1-12}$ alkylene group, $-CH_2-O-CH_2-CH_2-$, $-CH_2-CH_2-NH-CH_2-CH_2-$ or a $C_{1-4}$-alkylene-substituted phenylene group, and $R^1$ is as defined above; (C) a compound of the formula (III) or (VII)

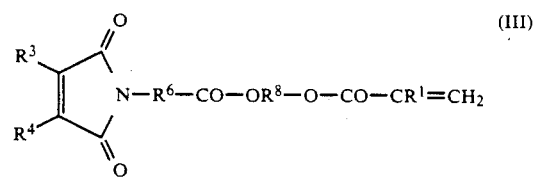

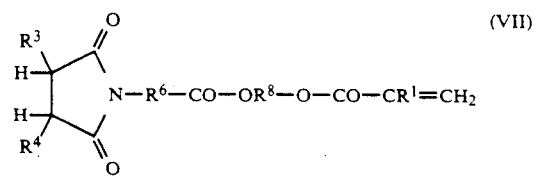

wherein $R^1$, $R^3$ and $R^4$ are as defined above, $R^6$ is a phenylene group or an alkylene group corresponding to the formula

wherein $R^7$ is a hydrogen atom or a straight chain or branched $C_{1-11}$ alkyl radical and $R^8$ is a $C_{2-10}$ alkylene group; (D) a compound of the formula (IV)

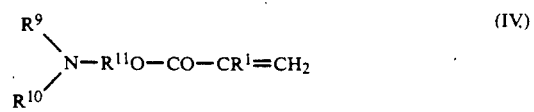

wherein $R^1$ is as defined above, $R^9$ is a phenyl or benzyl group, $R^{10}$ is as $C_{1-16}$ alkyl group and $R^{11}$ is a $C_{2-6}$ alkylene group, or $R^9$ and $R^{10}$ are $C_{1-16}$ alkyl groups and $R^{11}$ is a phenylene group; or (E) a compound of the formula (V)

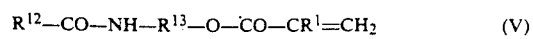

wherein $R^{12}$ is a $C_{7-33}$ alkyl group and $R^{13}$ is a $C_{2-4}$ alkylene group and $R^1$ is as defined above wherein the molar ratio of (A) to (B), (C), (D), or (E) is equal to from about 1.0:0.5 to about 1.0:10.0 and (2) heating the coated substrate to a temperature sufficient to crosslink said resin. Individual olefins corresponding to formulae II to VII or even mixtures of these olefins may be used to make the copolymers described above.

DESCRIPTION OF THE PREFERRED EMBODIMENTS

In accordance with the purpose for which they are to be used, the copolymers described above should be solid at ambient temperature and should have softening points of preferably at least 40.C. Should a given copolymer not meet this requirement, suitable measures for increasing the softening points are well-known to the expert, including for example changing the ratios of acrylates and N-containing olefins, the polymerization conditions and the like.

The acrylates corresponding to formula I are fatty acid esters of acrylic and methacrylic acid, derivatives of acrylic acid being preferred.

The alcohol component of the acrylates corresponding to formula I is formed by $C_{16-34}$ alcohols, more especially cetyl, stearyl, arachidyl, behenyl and lignoceryl alcohol, technical $C_{18}/C_{22}$ fatty alcohol mixtures containing more than 40% to more than 70% benzyl alcohol being particularly preferred.

In the acrylates corresponding to formula II, $R^1$ has the meanings defined above, preferably hydrogen. The groups $R^3$ and $R^4$ represent together or separately hydrogen or $C_{1-4}$ alkyl groups, such as methyl, ethyl, n-propyl, i-propyl, n-butyl, s-butyl and t-butyl; together, they may even form an aromatic or non-aromatic $C_5$ or $C_6$ ring optionally substituted by $C_{1-4}$ alkyl with the above meanings. The imide group of the N-containing olefins of the formula

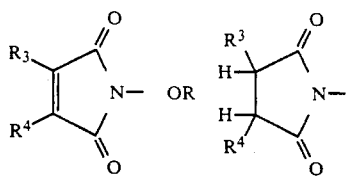

are preferably selected from the group consisting of residues of phthalimide, tetrahydrophthalimide, methyl tetrahydrophthalimide, methyl hexahydrophthalimide, maleic imide and succinimide; besides phthalimide and hexahydrophthalimide. The most preferred phthalic acid derivatives are 1,2,3,6-tetrahydrophthalimide, 4-methyl-1,2,3,6-tetrahydrophthalimide and 4-methyl hexahydrophthalimide.

The group $R^5$ in formula II is a straight-chain or branched $C_{1-12}$ and more especially $C_{1-6}$ alkylene group, more especially ethylene, propylene, butylene, pentylene, hexylene, octylene, decylene and dodecylene. The $C_{1-6}$ alkylene groups mentioned above are preferred. In addition, the group $R^5$ may be phenylene or $C_{1-4}$-alkylene-substituted phenylene, more especially methylene phenylene.

N-acrylates corresponding to formula II are preferably obtained by reaction of the corresponding cyclic anhydrides having the following formula

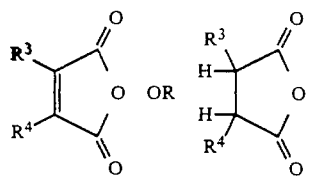

with amino alcohols corresponding to the following formula $H_2N-R^5-OH$ more especially with aminoethanol, omegaaminopropanol, -butanol, -pentanol, -hexanol, -octanol, -decanol, -dodecanol, 1-amino-2-propanol, 4-hydroxyethyl or 4-hydroxymethyl aniline, 4-aminocyclohexanol. The free OH group of the compounds thus obtained is then reacted with acrylic or methacrylic acid or reactive derivatives thereof by standard methods.

Other amino alcohols suitable for use in this reaction are, for example, 1-amino-2-hydroxypropane, 2-amino-1-hydroxypropane, 2-amino-2'-hydroxydiethyl ether, 2-amino-2'-hydroxydiethyl amine and 2-amino-1-hydroxybutane and also 1-amino-2,2-dimethyl-3-hydroxypropane.

Another method of preparing N-containing olefins corresponding to general formula II is to start from the corresponding N-unsubstituted cyclic imdies and to react them with formaldehyde. The N-hydroxymethyl compounds obtained may then be esterified in the usual way with reactive derivatives of acrylic and methacrylic acid.

In the N-containing olefins corresponding to formula III, in which $R^1$, $R^3$ and $R^4$ and also the cyclic imide radical are as defined above, the group $R^6$ is a phenylene radical or an alkylene group containing 1 to 12 carbon atoms, with the proviso that the alkylene radical has the following structure

in which $R^7$ is a hydrogen atom or an optionally branched $C_{1-11}$ alkyl radical. Preferred compounds are those in which the substituent $R^6$ is a methylene group or a $C_{1-5}$-monoalkylsubstituted methylene group. The meanings of the $C_{1-5}$ alkyl substituent are the same as stated above for $C_{1-4}$, but including pentyl.

The N-containing olefins corresponding to formula III may be obtained by initially reacting the corresponding cyclic anhydrides with amino acids corresponding to the following general formula

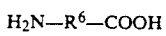

Suitable amino acids are glycine, alanine, valine, leucine, isoleucine, phenylalanine, caprolactam and the like, glycine being preferred. Another suitable amino acid is 4-aminobenzoic acid. The imidocarboxylic acids thus obtained may then be reacted in the usual way with hydroxy-$C_{2-10}$- and more especially $C_{2-4}$-alkyl acrylates and methacrylates. The reaction with the hydroxyethyl derivatives of the above mentioned acrylic acids is particularly preferred.

In the N-containing olefins of formula IV, $R^9$ is a phenyl or benzyl group, $R^{10}$ is a $C_{1-16}$ alkyl group and preferably a $C_{1-4}$ alkyl group and $R^{11}$ is a $C_{2-6}$ alkylene group, more especially a $C_{2-4}$ alkylene group. Alternatively, $R^9$ and $R^{10}$ may also be $C_{1-16}$ alkyl groups and preferably $C_{1-4}$ alkyl groups with the above meanings while $R^{11}$ may be a phenylene group.

The N-containing olefins corresponding to formula IV may be obtained by reaction of hydroxyalkyl amines corresponding to the following formula

$$R^9R^{10}N-R^{11}-OH$$

with acrylic or methacrylic acids, esters or reactive derivatives of the acids in the usual way. Particularly advantageous hydroxyalkyl amines are those in which $R^9$ is a phenyl or benzyl group, $R^{10}$ is a $C_{1-4}$ alkyl group and the hydroxyalkyl group contains two to four carbon atoms. Alternatively, $R^9$ and $R^{10}$ may be $C_{1-4}$ alkyl groups, a hydroxyphenyl group taking the place of the hydroxyalkyl group.

Particularly preferred representatives of the N-containing olefins of formula IV are those in which $R^9$ is benzyl or phenyl, $R^{10}$ is methyl or ethyl and $R^{11}$ represents $C_{2-6}$ alkylene radicals. They are obtained from the following hydroxyalkyl amines: N-benzyl-N-methyl hydroxyethyl amine, hydroxypropyl amine, hydroxybutyl amine, hydroxypentyl amine, hydroxyhexyl amine and the corresponding N-benzyl-N-ethyl, N-phenyl-N-methyl and N-phenyl-N-ethyl-N-hydroxyalkyl amines.

In the N-containing olefins corresponding to formula V, $R^{12}$ is a $C_{7-33}$ alkyl group, more especially a $C_{15-23}$ alkyl group. The residue $R^{12}$—CO is thus the residue of a $C_{8-34}$ and more especially $C_{16-24}$ fatty acid of natural, for example vegetable, animal or sea-animal, origin or synthetic origin or a technical mixture thereof. Typical examples of such fatty acids are caprylic acid, capric acid, lauric acid, myristic acid, palmitic acid, stearic acid, arachic acid, behenic acid and montanic acid and also lauroleic acid, myristoleic acid, palmitoleic acid, oleic acid and erucic acid. The N-containing olefins of formula VI may be obtained by reaction of the corresponding fatty acids or fatty acid mixtures with $C_{2-4}$ alkanolamines to the corresponding fatty acid alkanolamides and acylation of the hydroxyl function in the usual way with reactive derivatives of acrylic or methacrylic acid.

The reaction of the acrylates corresponding to formula I with the N-containing olefins II, III, IV and V is carried out in the presence of inert organic solvents, such as xylene, tetralin and other relatively high-boiling solvents, for example solvents rich in aromatic fractions, such as Solvesso 200, and in the presence of radical polymerization initiators of the type typically used for the copolymerization of acrylates, cf. Kirk-Othmer, Vol. 13, 1981, pages 355–373. A preferred initiator is, for example, azoisobutyrodinitrile (AIBN). The copolymerization normally takes place at temperatures in the range from about 80° to 100° C.

It has also proved to be of particular advantage to use copolymers of the type mentioned at the beginning obtained by copolymerization of acrylates corresponding to formula VIII $$CH_2=CR^1-CO-OR^2 \quad (I)$$

wherein $R^1$ is hydrogen and $OR^2$ is the residue of a $C_{16-24}$ fatty alcohol, more especially a technical fatty alcohol mixture rich in behenyl alcohol (behenyl alcohol content more than 40 to more than 70%) with an N-containing olefin corresponding to formula (II) or (VI)

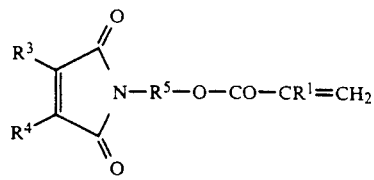

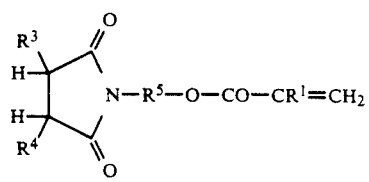

in which the substituents $R^3$ and $R^4$ are as defined above and $R^5$ is a $C_{2-8}$ and more especially $C_{2-3}$ alkylene radical, in molar ratios of compound I to compound II or VI of 1:0.5 to 1:10. Copolymers of the type mentioned at the beginning obtained by copolymerization of an acrylate corresponding to formula I, in which the group $OR^3$ is the residue of a $C_{16-24}$ fatty alcohol, more especially a technical fatty alcohol mixture rich in behenyl alcohol (behenyl alcohol content more than 40 to more than 70%) with an N-containing olefin corresponding to formula XI

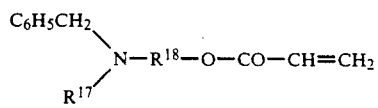

in which $R^{17}$ is a $C_{1-4}$ alkyl group and $R^{18}$ is an ethylene group, in molar ratios of the compounds I to XI of 1:0.5 to 1:10, have also proved to be particularly advantageous.

The present invention also relates to powder coatings containing thermoplastic or thermosetting synthetic resins and, based on the total weight of the powder coatings, 0.1 to 2.0% by weight of one or more of the copolymers to be used in accordance with the invention and, optionally, typical additives, such as hardeners, hardening accelerators, pigments and UV stabilizers. Powder coatings based on epoxides for crosslinking with dicyanodiamides and on carboxyfunctional polyesters for crosslinking with triglycidyl isocyanurates are particularly preferred.

The preparation of the copolymers to be used in accordance with the invention is described in detail in the following with reference to preferred examples of embodiment.

1. Preparation of N-containing olefins corresponding to general formulae II, III, IV and V (starting compounds for the copolymerization = N-containing olefins A to M).

Prepared N-containing olefins A to H are shown together with their starting compounds and physical characteristics in Table 1 below. They were obtained from the corresponding anhydrides in a two-stage synthesis via the hydroxyimides in accordance with the following general procedure:

a) Hydroxyimide synthesis

1 Mol of the amino alcohol was slowly added dropwise to 1 mol of the particular anhydride in 400 ml xylene, the mixture undergoing an increase in temperature. After the dropwise addition, the mixture was heated to 170° C. and the water of reaction was distilled off azeotropically on a water separator. The elimination of water was over after about 3 hours. The product could be isolated by removal of the solvent or directly further reacted in solution.

separator to a temperature of approximately 110° to 130° C. Approximately 95% of the theoretical quantity of water was eliminated over a period of 3 hours. The solvent was removed in vacuo at a maximum temperature of 140° C. The solid residue was suspended in 300 ml 0.5 N HCl, filtered under suction, washed repeatedly

TABLE 1

N-containing olefins of anhydrides, aminoalcohols and acrylic acid

| | | Hydroxyimide synthesis | | | Reaction with acrylic acid | | | |
|---|---|---|---|---|---|---|---|---|
| Anhydride | Aminoalcohol | Yield[1] % | Mp. °C. | OHV[2] | Product | Yield % | Mp. °C. | N-olefin |
| Phthalic anhydride | 2-Aminoethanol | 98 | 127 | — | (Phthalimido-N-ethyl)-acrylate | 92 | 105 | A |
| Tetrahydrophthalic anhydride | 2-Aminoethanol | 100 | 70 | — | (Tetrahydrophthal-imido-N-ethyl)-acrylate | 89 | Liquid | B |
| 4-Methylhexahydro-phthalic anhydride | 2-Aminoethanol | 98 | — | 259 | (4-Methylhexa-hydrophthalimido-N-ethyl)-acrylate | 91 | Liquid | C |
| Succinic anhydride | 2-Aminoethanol | 97 | 60 | | (Succinimido-N-ethyl)-acrylate | 50 | | D |
| Phthalic anhydride | 1-Amino-2-propanol | 97 | 88 | | (Phthalimido-N-isopropyl)-acrylate | 85 | 65 | E |
| Phthalic anhydride | 2-(4-Amino-phenyl)-ethanol | 94 | | 201 | [Phthalimido-N-(4-ethylphenyl)]-acrylate | 89 | 105 | F |
| 4-Methylhexahydro-phthalic anhydride | 6-Amino-1-hexanol | 100 | | 201.5 | (4-methylhexa-hydrophthalimido-N-hexyl)-acrylate | 90 | Liquid | G |
| Succinic anhydride | 6-Amino-1-hexanol | 96 | | 252 | (Succinimido-N-hexyl)-acrylate | 74 | | H |

[1]Calculated on the basis of the water of reaction collected
[2]OHV = hydroxyl value in mg KOH/g substance b) Reaction of the hydroxyimides obtained as described above with acrylic acid to form the N-containing olefins A to H.

1 Mol of the particular hydroxyimide and 1 mol acrylic acid were heated with 1 g hydroquinone monomethyl ether and 1 g concentrated sulfuric acid in 200 ml xylene to approximately 140 to 150° C. on a water separator until substantially the theoretical quantity of water had been eliminated. The product could be directly used for polymerization or could be isolated after washing with water and hydrogen carbonate solution and removal of the xylene.

2. Preparation of other N-containing olefins I, J, K, L and M (Phthalimido-N-methyl)-acrylate [I]

88 ml 37% formaledhyde solution and 190 ml distilled water were added to 100 g phthalimide (0.68 mol), followed by stirring for 4 hours at 98° C. The slightly cloudy solution was hot-filtered. The intermediate product, (N-hydroxymethyl)-phthalimide, precipitated on cooling in the form of a white crystalline solid. Mp. 104° C.

To prepare the title compound, 1 mol (N-hydroxymethyl)-phthalimide and 1 mol acrylic acid were introduced into 600 ml xylene and, after addition of 1 g hydroquinone monomethyl ether and 1 g concentrated sulfuric acid, were esterified at approximately 140° C. until no more water of reaction was formed.

The product remaining behind after removal of the solvent had a melting point of 115° C.

Phthalimido-N-(methylcarboxyethyl)-acrylate (J)

N-(phthaloylglycine)

1 mol phthalic anhydride, 1 mol glycine and 0.1 mol triethylamine were heated in 200 ml toluene on a water with water and dried. A white product melting at 190° C. was obtained.

Reaction of N-phthaloylglycine to N-containing olefin J 41.0 g (0.2 mol) N-phthaloylglycine and 69.6 g (0.6 mol) hydroxyethyl acrylate were heated on a water separator in 200 ml toluenewith addition of 0.6 g hydroquinone monomethyl ether and 0.6 g concentrated sulfuric acid. The internal temperature was 110° to 130° C. After the elimination of 3.5 g water (theoretical 3.6 g), corresponding to a conversion of approximately 97%, the reaction was terminated (after about 3.5 hours). After dilution with another 200 ml toluene, the excess hydroxyethyl acrylate was removed by washing with water. The reaction mixture was then deacidified with hydrogen carbonate and the solvent removed, the product accumulating in the form of a yellowish oil (OH value 0, residual acid value 8 (mg KOH/g substance).

Phthalimido-N-(methylcarboxyproypl)-methacrylate (K)

1 mol phthalolglycine and mol hydroxypropyl methacrylate were heated in 400 ml toluene on a water separator after the addition of 1 g hydroquinone monomethyl ether and 1 g concentrated sulfuric acid until substantially the theoretical quantity of water had been eliminated. The toluene solution was washed with water; the toluene was distilled off in vacuo.

$C_{16/18}$ fatty acid amidoethyl acrylate (L)

$C_{16/18}$ fatty acid monoethanolamide 0.5 mol $C_{16/18}$ fatty acid methyl ester and 1 mol 2-(methylamino)-ethanol were mixed and, after the addition of 1% tin powder, the resulting mixture was heated for 6 hours to 150° C., approximately 80% of the theoretical quantity of methanol being eliminated. The bath temperature was then increased to 200 C and a vacuum applied for 30 minutes to remove residual methanol and excess aminoalcohol. A product melting at 40° C. was obtained.

$C_{16/18}$ fatty acid amidoethyl acrylate 1 mol acrylic acid and 1 mol of the $C_{16/18}$ fatty acid monoethanolamide prepared as described above were introduced into 300 ml toluene together with 1 g hydroquinone monomethyl ether and 1 g concentrated sulfuric acid and esterified for about 12 hours at 140° C. The solution was then filtered and the toluene distilled off in vacuo. The product obtained had a residual OH value of 15 and a residual acid value of 11.

Preparation of 1-N-benzyl-N-methylaminoethyl acrylate (M)

247.9 g (1.5 mol) N-benzyl-N-methyl ethanolamine (commercially available) and 126.0 g (1.75 mol) acrylic acid were heated in 300 ml xylene on a water separator after the addition of 1.5 g hydroquinone monomethyl ether and 1.5 g concentrated sulfuric acid. After 6 hours, 26 g water had been eliminated, corresponding to a quantitative reaction. Towards the end of the reaction, the internal temperature was increased to 170° C. by removal of xylene. Working up in the usual way produced a yellow-brown, thinly liquid oil having an OH value of 6.5 and an acid value of 9 mg KOH/g.

3. Preparation of the copolymers to be used in accordance with the invention

The copolymers produced are summarized in Tables 2 to 9 below.

EXAMPLE 1

Copolymer of (phthalimido-N-ethyl)-acrylate (N-containing olefin A) and behenyl acrylate (approx. 70% $C_{22}$ content)

24.5 g (0.1 mol) (phthalimido-N-ethyl)-acrylate and 37.5 g (0.1 mol) behenyl acrylate were heated to 80° C. in 37.5 g xylene. 0.46 g ($2.8 \times 10^{-3}$ mol) azobisisobutyronitrile (AIBN) in 24.5 g xylene were then added over a period of 1 hour, followed by an after-reaction for 2 hours at 100° C.

EXAMPLES 2 to 15, 22 to 31

These copolymers were prepared in the same way as described in Example 1.

EXAMPLES 16 to 21

The preparation of the copolymers of these Examples according to the invention is described in the following with reference to Example 17 to which it is analogous:

Preparation of the (phthalimido-N-ethyl)-acrylate behenyl acrylate polymer (monomer inflow process)

0.046 g AIBN in 2.45 g xylene (= 10% of the starter solution) was added over a period of 6 minutes at 80° C. to a solution of 2.45 g (0.01 mol) (phthalimido-N-ethyl)-acrylate and 3.75 g (0.01 mol) behenyl acrylate in 3.75 g xylene (= 10% of the monomer mixture).

A solution heated to 80° C. of 22.5 g (0.09 mol) (phthalimido-N-ethyl)-acrylate and 33.75 g (0.09 mol) behenyl acrylate in 33.75 g xylene and a solution of 0.414 g AIBN in 22.05 g xylene were then simultaneously added over a period of 54 minutes at the same temperature of 80° C., followed by an after-reaction for 2 hours at 100° C.

The other copolymers synthesized by the monomer inflow process are prepared in the same way using the molar ratios shown in the Tables.

TABLE 2

Copolymerization in xylene at 80° C., one-pot process, starter AIBN added

| Example | Copolymer N-containing olefin Specific viscosity 10% in xylene, 25° C. | Mol | Monomers Fatty alcohol acrylate | Mol |
|---|---|---|---|---|
| 1 2.68 | A | 1 | Behenyl acrylate (~70% $C_{22}$) | 1 |
| 2 0.84 | E | 1 | Behenyl acrylate (~70% $C_{22}$) | 1 |
| 3 0.83 | C | 1 | Behenyl acrylate (~70% $C_{22}$) | 1 |
| 4 0.90 | G | 1 | Behenyl acrylate (~70% $C_{22}$) | 1 |
| 5 0.91 | D | 1 | Behenyl acrylate (~70% $C_{22}$) | 1 |
| 6 0.76 | H | 1 | Behenyl acrylate (~70% $C_{22}$) | 1 |
| 7 1.03 | B | 1 | Behenyl acrylate (~70% $C_{22}$) | 1 |
| 8 1.04 | I | 1 | Behenyl acrylate (~70% $C_{22}$) | 1 |
| 9 1.06 | F | 1 | Behenyl acrylate (~70% $C_{22}$) | 1 |

TABLE 3

Copolymerization in xylene at 80° C., one-pot process, starter AIBN added

| Example | Copolymer N-containing olefin Specific viscosity 10% in xylene, 25° C. | Mol | Monomers Fatty alcohol acrylate | Mol |
|---|---|---|---|---|
| 10 0.62 | L | 1 | Behenyl acrylate (~45% $C_{22}$) | 1 |
| 11 0.54 | L | 1 | Behenyl acrylate (~45% $C_{22}$) | 0.5 |

TABLE 4

Copolymerization in xylene at 80° C., one-pot process, starter AIBN added

| Example | Copolymer N-containing olefin Specific viscosity 10% in xylene, 25° C. | Mol | Monomers Fatty alcohol acrylate | Mol |
|---|---|---|---|---|
| 12 4.02 | A | 0.66 | Behenyl acrylate (~70% $C_{22}$) | 1 |
| 13 2.62 | A | 1.5 | Behenyl acrylate (~70% $C_{22}$) | 1 |
| 14 1.75 | A | 3.0 | Behenyl acrylate (~70% $C_{22}$) | 1 |
| 15 1.62 | E | 3.0 | Behenyl acrylate (~70% $C_{22}$) | 1 |

TABLE 5

Copolymerization in xylene at 80° C., monomer inflow process, starter AIBN added

| Example | Copolymer N-containing olefin Specific viscosity 10% in xylene, 25° C. | Mol | Monomers Fatty alcohol acrylate | Mol |
|---|---|---|---|---|
| 16 | A | 0.66 | Behenyl acrylate | 1 |

TABLE 5-continued

Copolymerization in xylene at 80° C.,
monomer inflow process, starter AIBN added

| Example | Copolymer N-containing olefin | Copolymer Specific viscosity 10% in xylene, 25° C. | Mol | Monomers Fatty alcohol acrylate | Mol |
|---|---|---|---|---|---|
| 17 | A | 1.47 | 1.0 | Behenyl acrylate (70% C$_{22}$) | 1 |
| 18 | A | 1.22 | 1.5 | Behenyl acrylate (70% C$_{22}$) | 1 |
| 19 | A | 1.18 | 3.0 | Behenyl acrylate (70% C$_{22}$) | 1 |
| 20 | E | 1.06 | 3.0 | Behenyl acrylate (70% C$_{22}$) | 1 |
| 21 | A | 1.55 | 9.0 | Behenyl acrylate (70% C$_{22}$) | 1 |
|    |   | 1.25 |     |                                  |   |

TABLE 6

Copolymerization in xylene at 80° C.,
one-pot process, starter AIBN added

| Example | Copolymer N-containing olefin | Copolymer Specific viscosity 10% in xylene, 25° C. | Mol | Monomers Fatty alcohol acrylate | Mol |
|---|---|---|---|---|---|
| 22 | A | 2.45 | 0.66 | Behenyl acrylate (~45% C$_{22}$) | 1 |
| 23 | A | 1.84 | 1.0 | Behenyl acrylate (~45% C$_{22}$) | 1 |
| 24 | A | 1.75 | 3.0 | Behenyl acrylate (~45% C$_{22}$) | 1 |
| 25 | A | 4.02 | 0.66 | Behenyl acrylate (~70% C$_{22}$) | 1 |
| 26 | A | 4.21 | 1.0 | Behenyl methacrylate (~70% C$_{22}$) | 1 |
| 27 | A | 2.08 | 1.0 | Behenyl acrylate (~98% C$_{22}$) | 1 |
| 28 | A | 2.85 | 3.0 | Stearyl acrylate | 1 |

TABLE 7

Copolymerization in xylene at 80° C.,
one-pot process, starter AIBN added

| Example | Copolymer N-containing olefin | Copolymer Specific viscosity 10% in xylene, 25° C. | Mol | Monomers Fatty alcohol acrylate | Mol |
|---|---|---|---|---|---|
| 29 | M | 0.72 | 1.00 | Behenyl acrylate (~45% C$_{22}$) | 1 |
| 30 | M | 0.86 | 0.66 | Behenyl acrylate (~45% C$_{22}$) | 1 |
| 31 | M | 1.04 | 0.33 | Behenyl acrylate (~45% C$_{22}$) | 1 |

The copolymers used in accordance with the invention were tested in the following powder coating systems for their suitability as flow control agents.

1. Epoxy paint

A powder coating composition of 22.5 parts by weight titanium dioxide, 96.4 parts by weight of an epoxy resin I, 18.8 parts by weight of an epoxy resin II and 2.3 parts by weight dicyanodiamide was mixed with 0.5% by weight of the flow control agent to be tested. The resulting mixture was then extruded, granulated, ground and sieved. The powder paints obtained were applied electrostatically to a metal surface and stoved for 12 minutes at 180° C. The epoxy resins used were commercially available products based on bisphenol A and epichlorohydrin having the following characteristics:

|  | I | II |
|---|---|---|
| Epoxide equivalent weight (g resin with 1 mol epoxide) | 850-940 | 450-500 |
| Ester equivalent weight (g resin for esterification of 1 mol monocarboxylic acid) | 179 | 149 |
| Hydroxyl value (g resin with 1 mol hydroxyl) | 0.33 | 0.26 |

The flow control agents according to Examples 13, 14, 15, 18, 19 and 20 showed excellent results in the form of good substrate wetting, absence of craters and good levelling.

2. Polyester paint

A powder paint was prepared as described in 1. from 55.3 parts by weight of a polyester resin containing free carboxyl groups, 40.0 parts by weight titanium dioxide and 4.2 parts by weight triglycidyl isocyanurate with addition of 0.5% by weight flow control agent and applied to a metal surface. The polyester resin had the following

| Softening point (Kofler) | 77-87° C. |
|---|---|
| Glass transition temperature | 55-60 |
| Melt viscosity DIN 53 229, 160° C., cone/plate | 30-60 Pa.s |
| Acid value DIN 53 402 | 30-36 mg KOH/g |

The stoving conditions were 5 minutes at 200° C., 8 minutes at 180° C. or 17 minutes at 165° C. (object temperature in each case).

Under the test conditions, the flow control agents according to Examples 1, 14, 15, 24 and 29 produce satisfactory levelling and a fault-free surface. In the absence of the flow control agents, poor paint quality was obtained in the form of extensive fish-eye formation and occasional craters.

What is claimed is:

1. A powder coating process comprising the steps of:
(1) applying a powder coating composition comprising a thermoplastic or thermosetting resin and from about 0.1% to about 2.0% by weight of a flow control agent to a metal substrate, wherein said flow control agent is a copolymer comprising units of: (A) an acrylate of the formula (I)

$$CH_2=CR^1-CO-OR^2$$

wherein $R^1$ is a hydrogen atom or a methyl group and $OR^2$ is the residue of a $C_{16-34}$ fatty alcohol, and an N-containing olefin selected from the group consisting of: (B) a compound of the formula (II) or (VI)

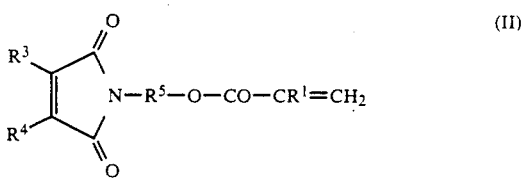

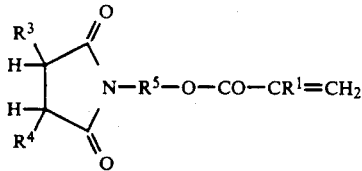

wherein $R^3$ and $R^4$ are together or separately hydrogen or $C_{1-4}$ alkyl groups or when taken together are ring fragments of an unsubstituted or a $C_{1-4}$-alkyl-substituted $C_5$ or $C_6$ ring, $R^5$ is a linear or branched $C_{1-12}$ alkylene group, $-CH_2-CH_2-O-CH_2-CH_2-$, $-CH_2-CH_2-NH-CH_2-CH_2-$, or a $C_{1-4}$-alkylene-substituted phenylene group and $R^1$ is as defined above; (C) a compound of the formula (III) or (VII)

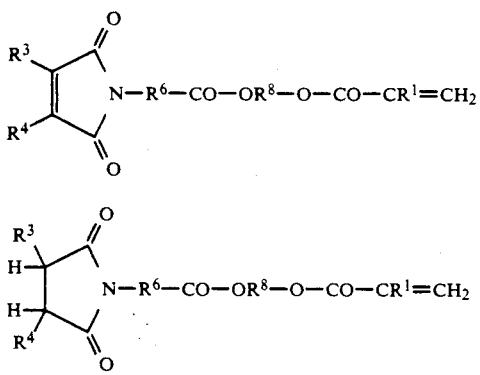

wherein $R^1$, $R^3$ and $R^4$ are as defined above, $R^6$ is a phenylene group or an alkylene group corresponding to the formula

wherein $R^7$ is a hydrogen atom or a straight chain or branched $C_{1-11}$ alkyl radical and $R^8$ is a $C_{2-10}$ alkylene group; (D) a compound of the formula (IV)

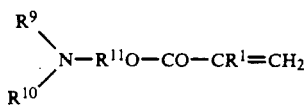

wherein $R^1$ is as defined above, $R^9$ is a phenyl or benzyl group, $R^{10}$ is a $C_{1-16}$ alkyl group and $R^{11}$ is a $C_{2-6}$ alkylene group, or $R^9$ and $R^{10}$ are $C_{1-16}$ alkyl groups and $R^{11}$ is a phenylene group; or (E)j a compound of the formula (V)

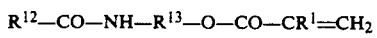

wherein $R^{12}$ is a $C_{7-33}$ alkyl group and $R^{13}$ is a $C_{2-4}$ alkylene group and $R^1$ is as defined above wherein the molar ratio of (A) to (B), (C), (D), or (E) is equal to from about 1.0:0.5 to about 1.0:10.0 and (2) heating the coated substrate to a temperature sufficient to fuse said powder coating composition.

2. The process of claim 1 wherein said powder coating composition further comprises an additive selected from the group consisting of a hardener, a hardening accelerator, a pigment, a U.V. stabilizer or combinations thereof.

3. The process of claim 1 wherein said powder coating composition is applied electrostatically.

4. The process of claim 1 wherein in formula I $R^1$ is hydrogen and $R^2$ is the residue of a $C_{16-24}$ fatty alcohol.

5. The process of claim 1 wherein in said compound of formula II, said unsubstituted $C_6$ ring is a benzene ring.

6. The process of claim 1 wherein in formula II and VI $R^5$ is a linear or branched $C_{1-6}$ alkylene group.

7. The process of claim 1 wherein in formula III and VII $R^6$ is a methylene group or a $C_{1-5}$-monoalkyl-substituted ethylene group.

8. The process of claim 1 wherein in formula III and VII $R^8$ is a $C_{2-4}$ alkylene group.

9. The process of claim 1 wherein in formula IV, $R^9$ is a phenyl or benzyl group, $R^{10}$ is a $C_{1-4}$ alkyl group and $R^{11}$ is a $C_{2-6}$ alkylene group.

10. The process of claim 1 wherein in formula IV, $R^9$ and $R^{10}$ are $C_{1-4}$ alkyl groups and $R^{11}$ is a phenylene group.

11. The process of claim 1 wherein in formula V, $R^{12}$ is a $C_{15-23}$ alkyl group.

12. The process of claim 1 wherein said copolymer is comprised of units of an acrylate of the formula (I)

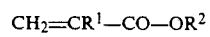

wherein $R^1$ is a hydrogen atom and $OR^2$ is the residue of a $C_{16-24}$ fatty alcohol, with an N-containing olefin selected from the group consisting of a compound of the formula (II) or (VI)

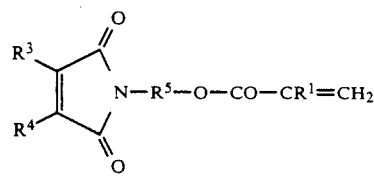

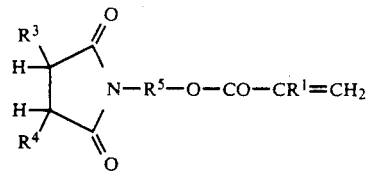

wherein $R^3$ and $R^4$ are together or separately hydrogen or a $C_{1-4}$ alkyl group, or when taken together are ring fragments or an unsubstituted or a $C_{1-4}$-alkyl-substituted $C_5$ or $C_6$ ring, and wherein the molar ratio of (I) to (II) or (VI) is equal to from about 1.0:0.5 to about 1.0:10.0.

13. The process of claim 1 wherein said copolymer is comprised of units of an acrylate of the formula (I)

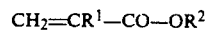

wherein $R^1$ is a hydrogen atom and $OR^2$ is the residue of a $C_{16-24}$ fatty alcohol, with an N-containing olefin of the formula (IV)

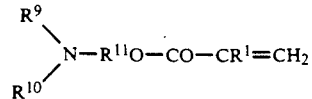

wherein $R^1$ is hydrogen, $R^9$ is a phenyl or benzyl group, $R^{10}$ is a $C_{1-4}$ alkyl group and $R^{11}$ is equal to from about 1.0:0.5 to about 1.0:10.0.

14. A powder coating composition comprising a thermoplastic or thermosetting resin and from about 0.1% to about 2.0% by weight of a flow control agent, wherein said flow control agent is a copolymer comprising units of: (A) an acrylate of the formula (I)

wherein $R^1$ is a hydrogen atom or a methyl group and $OR^2$ is the residue of a $C_{16-34}$ fatty alcohol, and an N-containing olefin selected from the group consisting of: (B) a compound of the formula (II) or (VI)

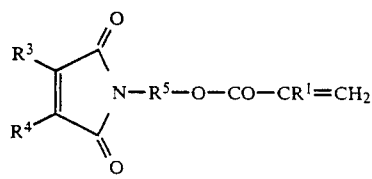

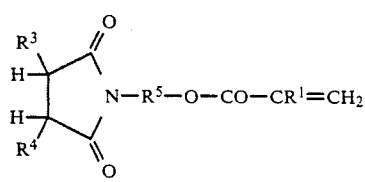

wherein $R^3$ and $R^4$ are together or separately hydrogen or $C_{1-4}$-alkyl-substituted $C_5$ or $C_6$ ring, $R^5$ is a linear or branched $C_{1-12}$ alkylene group, $-CH_2-CH_2-O-CH_2-CH_2-$, $-CH_2-CH_2-NH-CH_2-CH_2-$, or a $C_{1-4}$alkylene-substituted phenylene group, and $R^1$ is as defined above; (C) a compound of the formula

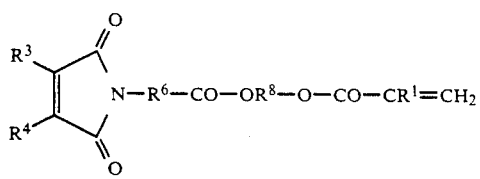

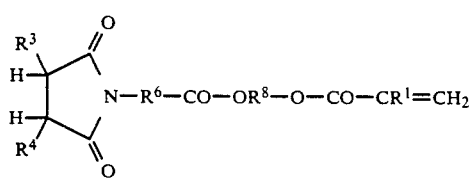

wherein $R^1$, $R^3$ and $R^4$ are as defined above, $R^6$ is a phenylene group or an alkylene group corresponding to the formula

wherein $R^7$ is a hydrogen atom or a straight chain or branched $C_{1-11}$ alkyl radical and $R^8$ is a $C_{2-10}$ alkylene group; (D) a compound of the formula (IV)

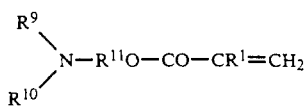

wherein $R^1$ is as defined above, $R^9$ is a phenyl or benzyl group, $R^{10}$ is a $C_{1-16}$ alkyl groups and $R^{11}$ is a $C_{2-6}$ alkylene group, or $R^9$ and $R^{10}$ are $C_{1-16}$ alkyl groups and $R^{11}$ is a phenylene group; or (E) a compound of the formula (V)

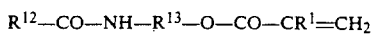

wherein $R^{12}$ is a $C_{7-33}$ alkyl group and $R^{13}$ is a $C_{2-4}$ alkylene group and $R^1$ is as defined above, wherein the molar ratio of (A) to (B), (C), or (E) is equal to from about 1.0:0.5 to about 1.0:10.0.

15. The powder coating composition of claim 14 wherein said composition further comprises an additive selected from the group consisting of a hardener, a hardening accelerator, a pigment, a U.V. stabilizer or combinations thereof.

16. The powder coating composition of claim 14 wherein in formula I $R^1$ is hydrogen and $R^2$ is the residue of a $C_{16-24}$ fatty alcohol.

17. The powder coating composition of claim 14 wherein in said compound of formula II, said unsubstituted $C_6$ ring is a benzene ring.

18. The powder coating composition of claim 14 wherein in formula II and VI $R^5$ is a linear or branched $C_{1-6}$ alkylene group.

19. The powder coating composition of claim 14 wherein in formula III and VII $R^6$ is a methylene group or a $C_{1-5}$-monoalkyl-substituted ethylene group.

20. The powder coating composition of claim 14 wherein in formula III and VII $R^8$ is a $C_{2-4}$ alkylene group.

21. The powder coating composition of claim 14 wherein in formula IV, $R^9$ is a phenyl or benzyl group, $R^{10}$ is a $C_{1-4}$ alkyl group and $R^{11}$ is a $C_{2-6}$ alkylene group.

22. The powder coating composition of claim 14 wherein the formula IV, $R^9$ and $R^{10}$ are $C_{1-4}$ alkyl groups and $R^{11}$ is a phenylene group.

23. The powder coating composition of claim 14 wherein in formula V, $R^{12}$ is a $C_{15-23}$ alkyl group.

24. The powder coating composition of claim 14 wherein said copolymer is comprised of units of an acrylate of the formula (I)

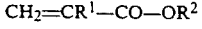

wherein $R^1$ is a hydrogen atom and $OR^2$ is the residue of a $C_{16-24}$ consisting of a compound of the formula (II) or (VI)

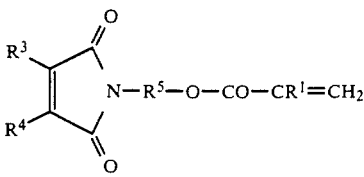

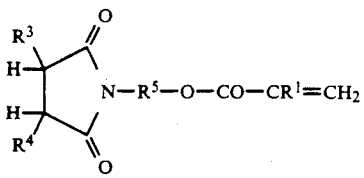

wherein $R^3$ and $R^4$ are together or separately hydrogen or a $C_{1-4}$ alkyl group or when taken together are ring fragments or an unsubstituted or a $C_{1-4}$-alkyl-substituted $C_5$ or $C_6$ ring.

25. The powder coating composition of claim 14 wherein said copolymer is comprised of units of an acrylate of the formula (I)

$$CH_w=CR^1-CO-OR^2$$

wherein $R^1$ is a hydrogen atom and $OR^2$ is the residue of a $C_{16-24}$ fatty alcohol, with an N-containing olefin of the formula (IV)

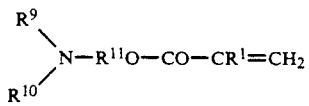 (IV)

wherein $R^1$ is hydrogen $R^9$ is a phenyl or benzyl group, $R^{10}$ is a $C_{1-4}$ alkyl group and $R^{11}$ is an ethylene group.

26. A method for controlling the flow properties of a powder coating composition comprising adding to a powder coating composition which contains a thermoplastic or thermosetting resin from about 0.1% to about 2.0% by weight of a flow control agent which is a copolymer comprising units of: (A) an acrylate of the formula (I)

$$CH_2=CR^1-CO-OR^2 \qquad I$$

wherein $R^1$ is a hydrogen atom or a methyl group and $OR^2$ is the residue of a $C_{16-34}$ fatty alcohol, and an N-containing olefin selected from the group consisting of: (B) a compound of the formula (II) or (VI)

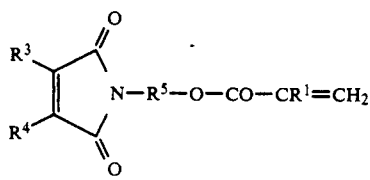 (II)

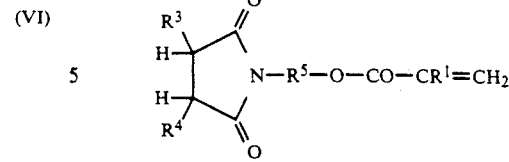 (VI)

wherein $R^3$ and $R^4$ are together or separately hydrogen or $C_{1-4}$ alkyl groups or when taken together are ring fragments of an unsubstituted or a $C_{1-4}$-alkyl-substituted $C_5$ or $C_4$ ring, $R^5$ is a linear or branched $C_{1-12}$ alkylene group, $-CH_2-O-CH_2-CH_2-$, $-CH_2-CH_2-NH-CH_2-CH_2-$, or a $C_{1-4}$-alkylene-substituted phenylene group, and $R^1$ is as defined above; (C) a compound of the formula (III) or (VII)

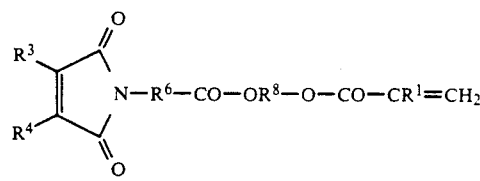 (III)

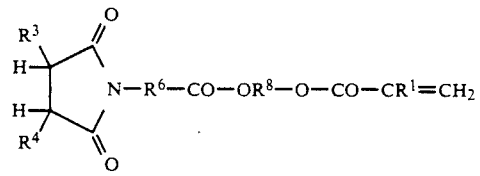 (VII)

wherein $R^1$, $R^3$ and $R^4$ are as defined above, $R^6$ is a phenylene group or an alkylene group corresponding to the formula

wherein $R^7$ is a hydrogen atom or a straight chain or branched $C_{1-11}$ alkyl radical and $R^8$ is a $C_{2-10}$ alkylene group; (D) a compound of the formula (IV)

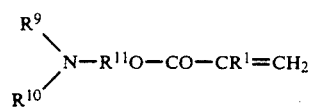 (IV)

wherein $R^1$ is as defined above, $R^9$ is a phenyl or benzyl group, $R^{10}$ is a $C_{1-16}$ alkyl group and $R^{11}$ is a $C_{2-6}$ alkylene group, or $R^9$ and $R^{10}$ are $C_{1-16}$ alkyl groups and $R^{11}$ is a phenylene group; or (E) a compound of the formula (V)

$$R^{12}-CO-NH-R^{13}-O-CO-CR^1=CH_2 \qquad (V)$$

wherein $R^{12}$ is a $C_{7-33}$ alkyl group and $R^{13}$ is a $C_{2-4}$ alkylene group and $R^1$ is as defined above, wherein the molar ratio of (A) to (B), (C), (D), or (E) is equal to from about 1.0:0.5 to about 1.0:10.0.

* * * * *